United States Patent
Lock

(10) Patent No.: US 9,420,355 B2
(45) Date of Patent: Aug. 16, 2016

(54) REAL-TIME LEARNING OF HASHTAG-TO-TV PROGRAM RELATIONSHIPS

(71) Applicant: Peel Technologies, Inc., Mountain View, CA (US)

(72) Inventor: Christopher Lock, Scotts Valley, CA (US)

(73) Assignee: Peel Technologies, Inc., Mountain View, CA (US)

(*) Notice: Subject to any disclaimer, the term of this patent is extended or adjusted under 35 U.S.C. 154(b) by 0 days.

(21) Appl. No.: 14/536,441

(22) Filed: Nov. 7, 2014

(65) Prior Publication Data

US 2015/0264445 A1    Sep. 17, 2015

Related U.S. Application Data

(60) Provisional application No. 61/954,580, filed on Mar. 17, 2014.

(51) Int. Cl.

| | | |
|---|---|---|
| H04N 7/173 | (2011.01) | |
| H04N 21/84 | (2011.01) | |
| H04N 21/482 | (2011.01) | |
| H04N 21/81 | (2011.01) | |
| H04N 21/478 | (2011.01) | |
| H04N 21/25 | (2011.01) | |
| H04N 21/258 | (2011.01) | |
| H04N 21/266 | (2011.01) | |
| H04N 21/278 | (2011.01) | |
| H04N 21/8405 | (2011.01) | |
| H04N 21/4788 | (2011.01) | |

(52) U.S. Cl.
CPC .............. *H04N 21/84* (2013.01); *H04N 21/25* (2013.01); *H04N 21/258* (2013.01); *H04N 21/26603* (2013.01); *H04N 21/278* (2013.01); *H04N 21/478* (2013.01); *H04N 21/4788* (2013.01); *H04N 21/482* (2013.01); *H04N 21/8126* (2013.01); *H04N 21/8405* (2013.01)

(58) Field of Classification Search
CPC .............. H04N 21/25; H04N 21/258; H04N 21/26603; H04N 21/278; H04N 21/8126; H04N 21/84; H04N 21/8405; G06F 17/30823; G06F 17/30837; G06F 17/30958; G06Q 50/01
USPC .................................................. 725/105, 115
See application file for complete search history.

(56) References Cited

U.S. PATENT DOCUMENTS 6,105,018 A * 8/2000 Demers et al.
8,135,662 B2   3/2012 Bollen et al.

(Continued)

OTHER PUBLICATIONS

PCT International Search Report and Written Opinion, PCT Application No. PCT/US2015/020829, Jun. 24, 2015, fifteen pages.

*Primary Examiner* — Jeremy Duffield
(74) *Attorney, Agent, or Firm* — Fenwick & West LLP

(57) ABSTRACT

Disclosed is a system, method, and computer program product for relating a metadata tag to a television program identifier and associating a hashtag with metadata associated with the television program. A mapping server receives a request that includes a metadata tag (e.g., a hashtag) for a social object, such as a comment or a post to a social network. The mapping server generates a graph to determine a set of television program identifiers likely associated with the metadata tag. Furthermore, the mapping server compresses graph data over time to reduce the time needed to perform a query to the graph.

20 Claims, 5 Drawing Sheets

(56) References Cited

U.S. PATENT DOCUMENTS

| | | |
|---|---|---|
| 8,583,725 B2 | 11/2013 | Gibson |
| 8,667,520 B2 | 3/2014 | Bhatia et al. |
| 9,009,192 B1 * | 4/2015 | Shmiel et al. ............... 707/774 |
| 2010/0241699 A1 | 9/2010 | Muthukumarasamy et al. |
| 2011/0173264 A1 | 7/2011 | Kelly |
| 2012/0060094 A1 | 3/2012 | Irwin et al. |
| 2013/0073638 A1 * | 3/2013 | Saiki et al. ................. 709/206 |
| 2013/0074109 A1 | 3/2013 | Skelton et al. |
| 2013/0268973 A1 | 10/2013 | Archibong et al. |
| 2013/0298038 A1 * | 11/2013 | Spivack et al. ............. 715/753 |
| 2014/0068674 A1 * | 3/2014 | Sirpal et al. .................. 725/43 |
| 2014/0089979 A1 * | 3/2014 | Asam et al. .................. 725/41 |
| 2014/0143336 A1 | 5/2014 | Arunachalam et al. |
| 2014/0297745 A1 * | 10/2014 | Tarbox ............... H04L 65/604 709/204 |

* cited by examiner

REAL-TIME LEARNING OF HASHTAG-TO-TV PROGRAM RELATIONSHIPS

CROSS REFERENCE TO RELATED APPLICATION

This application claims the benefit of U.S. Provisional Application No. 61/954,580, filed Mar. 17, 2014, which is incorporated by reference herein in its entirety.

BACKGROUND

1. Field of Art

The disclosure generally relates to the field of sharing media content online, and more specifically to relating media content to social objects on a social networking system.

2. Description of the Related Art

Internet users increasingly share media content online Users share media by posting links to images, videos, and articles on websites. For example, a user may upload and share a video on a social networking website. Other social network users may interact with the shared video, expanding the shared video's audience.

However, some forms of media content cannot be posted online. Television programs, for example, are conventionally shown on broadcast television and cannot be linked to online. Users may wish to share information in a post about a television program on a social network but cannot easily incorporate the information about the television program into the post.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
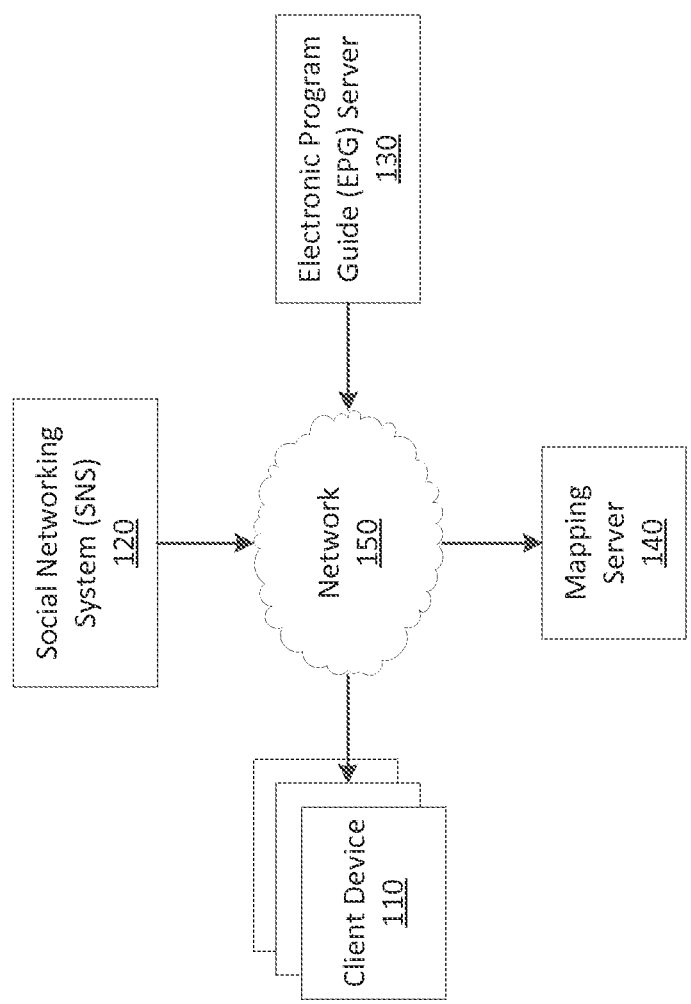
FIG. 1 illustrates a system environment for relating a metadata tag to a television program identifier, according to one example embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a system and method for relating a metadata tag to a television program associates a topic identifier or metadata tag (e.g., a hashtag, a URL, or an @-identifier) with metadata associated with the television program. Metadata tags are associated with social objects. A social object is a posting of content uploaded to the social network, typically provided for display to one or more social network members. Examples of social objects include postings ("posts"), comments, pictures, events, videos, hyperlinks, messages, or any other kind of content shared on the social network. The social objects are displayed on a webpage of the social networking website. In some embodiments, the social objects are displayed in a newsfeed, profile page, or message on the social networking site. A mapping server receives social object data. The social object data lists a set of hashtags or other social objects stored on the social networking system. The mapping server receives electronic program guide (EPG) data which includes information associated with a television program. The information may be a set of predetermined hashtags associated with the television program, a timestamp associated with the television program, or a television program identifier for the television program. The mapping server generates a graphical data structure, or graph, of the EPG data and the social object data. The graph includes nodes and edges between the nodes. Each node represents a metadata tag or a television program identifier. Each edge connects a node representing a metadata tag with a node representing another metadata tag or a television program identifier.

The mapping server receives a request for a television program identifier from the social networking system. The request is to identify a set of television program identifiers associated with the hashtag in the social object. The request may be in response to a hashtag or a social object added to the social networking system. The mapping server determines the set of television program identifiers associated with the hashtag in the request by traversing the graph constructed by the mapping server. The mapping server ranks the set of televisions program identifiers associated with the hashtag based on the number of connections between the hashtag and the television program identifier. Additionally or alternatively, the mapping server ranks the set of television program identifiers by the number of nodes between the hashtag and the television program identifier. The mapping server provides one or more television program identifiers from the set of television programs to the social networking system.

In other embodiments of a system, method, and computer-readable storage medium for relating a social object to a television program, a mapping server generates and maintains a graph based on electronic program guide data and social object data. The mapping server compresses a plurality of relationships along an edge into a single relationship on the edge. The multiple relationships may share a common timestamp or may have originated within a similar timeframe. Compressing the multiple relationships into a single relationship allows the mapping server to reduce, or "prune," the size of the graph without losing relationship information. Furthermore, reducing the size of the graph reduces the time needed to execute a query to the graph and reduces concurrency issues.

Computing Machine Architecture

FIG. 1 illustrates a system environment for relating a metadata tag to a television program identifier, according to one example embodiment. FIG. 1 includes one or more client devices 110, a social networking system (SNS) 120, an electronic program guide (EPG) server 130, a mapping server 140, and a network 150.

The client devices 110 are one or more computing devices capable of receiving user input as well as transmitting and/or receiving data via the network 150. In one embodiment, the client device 110 is a conventional computer system, such as a desktop or laptop computer. Alternatively, the client device 110 may be a device having computer functionality, such as a personal digital assistant (PDA), a mobile telephone, a smartphone, a tablet, or another suitable computing device. The client device 110 is configured to communicate via the network 150. In one embodiment, the client device 110 executes an application allowing a user of the client device 110 to interact with the social networking system 120. For example, the client device 110 executes a browser application to enable interaction between the client device 110 and the social networking system 120. In another embodiment, the client device 110 interacts with the social networking system 120 through an application programming interface (API) running on a native operating system of the client device 110, such as APPLE IOS® or GOOGLE ANDROID™.

The social networking system (SNS) 120 operates a social network. The SNS 120 includes social object data, which describes one or more social objects on the SNS 120. Social objects represent content on the social network. Examples of a social object include a page post, a status update, a photograph, a video, a link, a shared content item, a check-in event, a message, or any other type of content. In one embodiment, the social object includes a metadata tag, such as a hashtag, an @-identifier, or a hyperlink. The social object data further includes one or more relationship entries. The relationship entry indicates a relationship that connects two social objects. The relationship entry identifies two social objects that the relationship connects, a timeframe that indicates when the relationship was created, and a weight that indicates the number of times the relationship has been made.

The EPG server 130 is a server storing electronic program guide data. The EPG data includes information associated with one or more television programs. In the context of this application, the television program may be a broadcast TV show, a movie, a video clip, a video stream, or any other form of video media. The information may be a set of predetermined hashtags associated with the television program, a timestamp associated with the television program, or a television program identifier for the television program. The EPG data may be associated with a specific location or television service provider. Television service providers include broadcast and satellite television service providers. In other embodiments, the EPG data may be associated with one or more video streaming websites.

Figure 2:
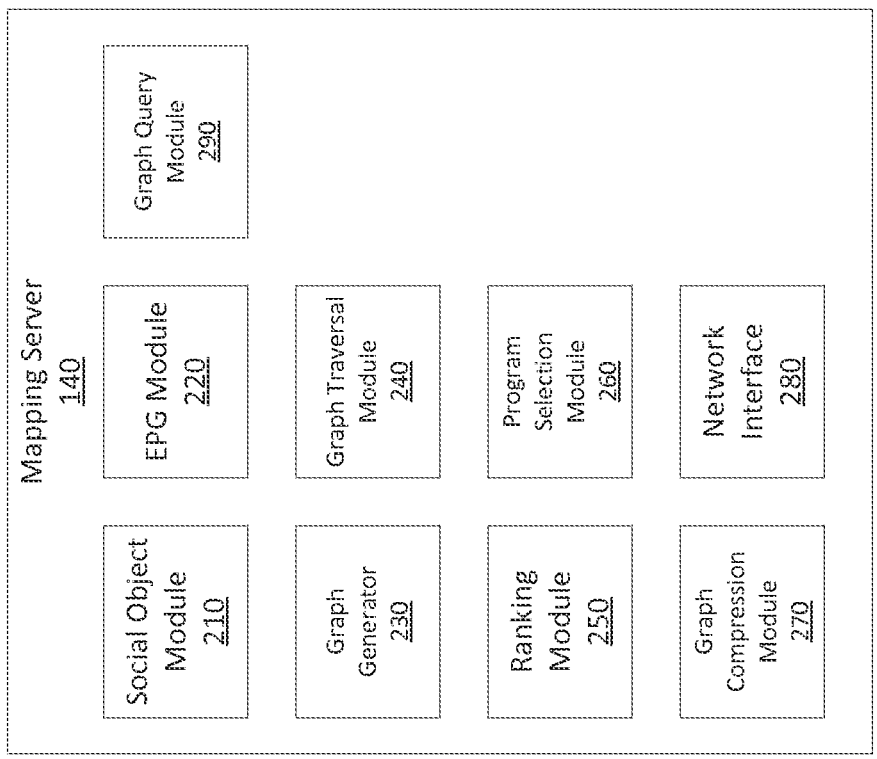
FIG. 2 illustrates a modular diagram of a mapping server for relating a metadata tag to a television program identifier, according to one example embodiment.

FIG. 2 illustrates a modular diagram of a mapping server for relating metadata tag to a television program identifier, according to one example embodiment. The mapping server 140 includes multiple modules, including a social object module 210, an EPG module 220, a graph generator 230, a graph traversal module 240, a ranking module 250, a television program selection module 260, a graph compression module 270, a network interface 280, and a graph query module 290.

The social object module 210 receives and processes social object data. The social object data may be received from the social networking system 120 or from the one or more client devices 110. The social object data comprises information about one or more social objects. Social objects represent content on the social network. Examples of a social object include a page post, a status update, a photograph, a video, a link, a shared content item, a check-in event, or any other type of content. The social object includes one or more metadata tags, such as hashtags, @-identifiers, or other forms of metadata tags.

The EPG module 220 receives and processes EPG data. The EPG data is received from the EPG server 130. The EPG data includes information about one or more television programs showing on channels associated with the EPG server 130. The EPG data may include a set of predetermined hashtags associated with the television program, a timestamp associated with the television program, and television program identifier for the television program.

The graph generator 230 generates a graph data structure, herein referred to as a graph. The graph is embodied as a graph data structure but may be any form of data structure, including but not limited to a hash table, an array, an object, or any other conventional data structure. The graph generator 230 generates the graph using EPG data and social object data, such as a metadata tag. The graph is comprised of nodes and edges between the nodes. Each node represents a metadata tag or a television program identifier. Each edge represents a relationship associating a metadata tag with either another metadata tag or a television program identifier. These relationships indicate that a set of metadata tags or television program identifiers are related by an edge. An edge exists between two metadata tags if the tags are both included in a social object. For example, an edge can exist between two nodes, representing hashtags "#swaggg" and "#tbt," if both hashtags are included in the same social network posting. Each edge has a weight that indicates the magnitude of the relationship. For example, the weight can indicate the number of times two metadata tags have been related over a time period or the number of times the two metadata tags have been included in the same posting.

The graph traversal module 240 receives a query for a television program identifier associated with a metadata tag or a social object. The query includes information identifying the metadata tag or identifying a social object that includes a metadata tag. The query is received in response to a social object or metadata tag being added or otherwise modified on the social networking system 120. For example, the query may be received in response to a social networking user adding a hashtag to the social networking system 120. The graph traversal module 240 selects a set of television program identifiers associated with the metadata tag included in the social object by traversing the graph generated by the graph generator 230. The graph is traversed along edges connecting the node, representing the metadata tag in the queried social object, to one or more television program identifiers.

In one embodiment, the graph traversal module 240 uses a breadth-first search to traverse the graph. The breadth-first search allows the graph traversal module 240 to determine the shortest distance between the metadata tag identified by the query and a television program identifier. In some embodiments, the graph traversal module 240 may additionally take into account the timeframe that the edge was created. For example, the breadth-first search may only traverse edges that were created within the last 24 hours. This enables the graph traversal module 240 to only traverse the most recently-posted hashtag relationships. In some embodiments, the graph traversal module 240 only traverses edges with a minimum weight. Other embodiments of the graph traversal module 240 use depth-first searches, exhaustive searches, or any other apparent search methods. The graph traversal module 240 selects a set of television program identifiers connected on the graph to the metadata tag identified by the query.

The ranking module 250 ranks the set of television program identifiers selected by the graph traversal module 240. The ranking module 250 ranks the set of television program identifiers by distance and prominence. The distance of a television program identifier is determined by the number of layers the graph traversal module 240 traverses, starting from the node associated with the queried metadata tag, before reaching a node associated with the television program identifier. In some embodiments, the number of layers is equal to the number of edges between the metadata tag and the television program identifier. The prominence is determined by the number of weight of an edge or edges between the node associated with the queried metadata tag and the node associated with the television program identifier. In some embodiments, the weight of the edge decreases over time, making new hashtag relationships more prominent. Each television program identifier in the set of television program identifiers is assigned a distance value and prominence value. The television program identifiers are ranked based on the distance values or prominence values.

The television program selection module 260 selects a subset comprising one or more of the ranked television program identifiers. The subset selected by the television program selection module 260 may include only the highest-ranked television program identifier, the top three television program identifiers, or any number of the ranked television program identifiers. In some embodiments, each television program identifier in the subset is below a minimum threshold distance value (e.g., within 3 degrees of separation from the social object) or exceeds a threshold prominence value (e.g., each edge between the social object and television program identifier has a minimum weight). The television program selection module 260 provides the selected subset to the social networking system 120.

The graph compression module 270 compresses data on the graph constructed by the graph generator 230. The graph compression module 270 compresses data on the graph by reducing the number of relationship entries (i.e., edges). The number of relationship entries in the graph is reduced by compressing a plurality of relationship entries between social objects and/or television program identifiers into a single relationship entry in the graph. In other words, the graph compression module 270 compresses a plurality of relationships, each associated with a weight, into a single relationship with a different weight. The graph compression module 270 groups the plurality of relationship entries by the timestamp associated with each relationship entry. In one example, each relationship entry in the plurality of compressed relationship entries is associated with a timestamp within the same timeframe. The graph compression module 270 generates a compressed relationship entry that accounts for each of the plurality of relationship entries. Compressing the multiple relationship entries into a single relationship entry allows the graph compression module 270 to reduce, or "prune," the size of the graph without losing relationship information. Furthermore, reducing the size of the graph reduces the time needed to execute a query to the graph and reduces concurrency issues.

The mapping server 140 communicates with client devices 110, social networking system 120, and the EPG server 130 through the network interface 280. The network interface 280 allows the mapping server 140 to access the network 150, which may comprise any combination of local area and/or wide area networks, using both wired and/or wireless communication systems. In one embodiment, the network 150 uses standard communications technologies and/or protocols. For example, the network 150 includes communication links using technologies such as Ethernet, 802.11, worldwide interoperability for microwave access (WiMAX), 3G, 4G, Long Term Evolution (LTE), code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 150 may be encrypted using any suitable technique or techniques.

The mapping server 140 includes a graph query module 290. The graph query module 290 receives a query from the client device 110 connected to the mapping server 140. In some embodiments, the query is generated by an application on the client device 110, such as a social networking application on the device. In other embodiments, the query can be from another server connected to the mapping server, such as the social networking system 120. For example, the social networking system 120 can generate a query to the mapping server 140 to determine whether a post or other social object should be presented for display to the user. The query is for a list of television program identifiers associated with a metadata tag included in a social object. The graph query module 290 interfaces with the graph traversal module 240 to run the query. The graph query module 290 sends the results of the query, e.g., the subset of ranked television identifiers, to the entity that queried the mapping server 140.

Example Method for Relating a Hashtag to a Television Show

Figure 3:
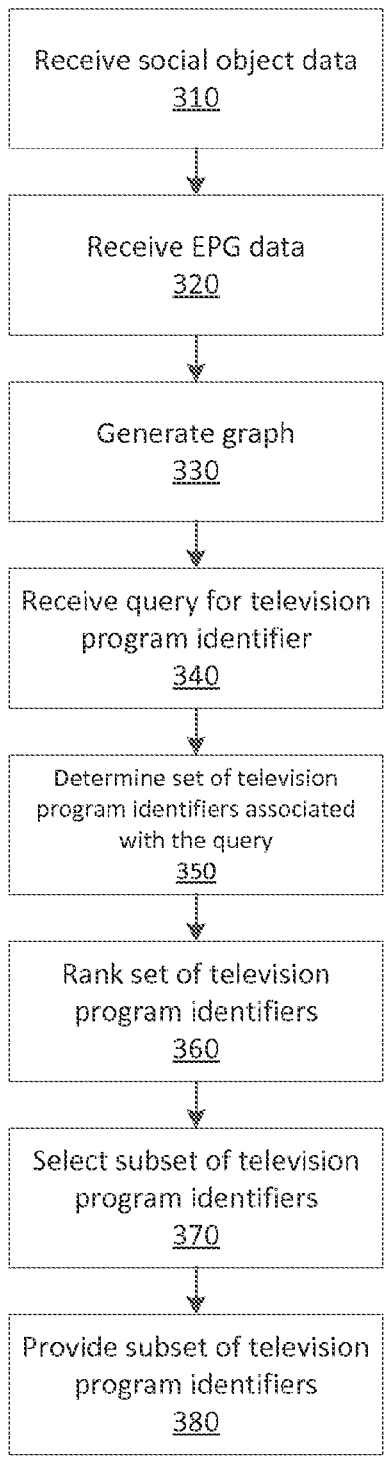
FIG. 3 illustrates a flowchart of a process for relating a metadata tag to a television program identifier, according to one example embodiment.

FIG. 3 illustrates a flowchart of a process for relating a metadata tag to a television program identifier, according to one example embodiment. In one embodiment, the process of FIG. 3 is enabled by at least in part by software code executing on the mapping server 140. For example, the mapping server 140 may comprise computer-executable instructions stored to a non-transitory computer storage medium that, when executed by a processor, causes the processor to perform the steps of FIG. 3 below. In other embodiments, the process of FIG. 3 is executed by hardware components, such as an application-specific integrated circuit (ASIC) or a microcontroller on the mapping server 140.

The mapping server 140 receives 310 social object data. The social object data includes a set of metadata tags (hashtags). The mapping server 140 may receive 310 the social object data from the social networking system 120 or from a client device 110 configured to access the social networking system 120.

The mapping server 140 receives 320 EPG data. The EPG data includes information associated with a television program. The information may be a set of predetermined social objects associated with the television program, a timestamp associated with the television program, and a television program identifier for the television program. The mapping server 140 may receive 320 the EPG data from the EPG server 130 or from the one or more client devices 110 configured to access the EPG server 130. Receiving 320 the EPG data can occur before or after the mapping server 140 receives 310 social object data.

The mapping server 140 generates 330 a graph. The graph is a graph data structure comprising the social object data and the EPG data. However, the graph may alternatively be embodied as any other data structure, such as a hash table, an array, a map, or any other conventional data structure or mathematical model.

The social object data and the EPG data are embodied as nodes and edges of the graph. Nodes are points on the graph. In one embodiment, nodes represent metadata tags. For example, a node may be associated with a hashtag identifier from the social object data. The nodes may also represent television program identifiers associated with the EPG data. For example, each television program identifier may be associated with a node.

Each node is connected to one or more adjacent nodes through an edge. The edge represents one or more non-directional relationships between two nodes. Each relationship along the edge is associated with a timestamp. The timestamp may indicate when the edge or relationship was created.

Some edges may be defined by users, allowing users to specify the relationship between metadata tags. For example, a user may add a post to the social networking system that includes two hashtags, "#hardcorr" and "#halloweenselfie." By including both hashtags in the same post, the user creates an edge between the two nodes that represent the hashtags. The relationship may be included in the social object data used to generate 330 the graph. Other edges are generated when users interact with social objects in the social networking system 120. For example, a user can add a hashtag to a page associated with a television program. For example, a user may post the hashtag "#phrasing" to a social network page for the television program Archer. Thus, a relationship may be formed between the hashtag and the television program identifier associated with the social network page. Edges are additionally generated from EPG data. For example, the EPG data may include one or more predetermined hashtags or other social objects associated with a television program. For example, the EPG data may specify that the hashtag "#sherlocklives" is associated with the television program Sherlock.

Multiple relationships may be present on one edge. For example, multiple users may generate relationships between the hashtags "#greendale" and "#community" by uploading posts that include both of the two hashtags. Each relationship may be associated with the edge between the two hashtags.

The mapping server 140 receives 340 a query for a television program identifier. The query is for a television program identifier associated with a social object on the social networking system 120. For example, the query may be received 340 in response to a hashtag posted to the social networking system 150. Queries may be automatically generated. For example, the query may be generated in response to a user posting a hashtag or performing any other action that includes a social object on the social networking system 120. The query may include the hashtag identifier associated with the queried hashtag.

The mapping server 140 determines 350 a set of television program identifiers associated with the query. The mapping server 140 determines the set of television program identifiers associated with the hashtag identifier in the query. The mapping server 140 traverses the graph to determine 350 each television program identifier associated with the hashtag identifier in the query.

In one embodiment, the mapping server 140 traverses the graph using a breadth-first search. In the breadth-first search, the mapping server 140 begins at a root node. The root node may be the hashtag identifier associated with the hashtag identified in the query. The mapping server 140 generates a set comprising every television program identifier adjacent to the root node. Each social object adjacent to the root node is the same distance (i.e., number of nodes away from) the root node. The social objects adjacent to the root node have a distance of 1. Each television program identifier in the set of television program identifiers adjacent to the root node (i.e., with a distance of 1) is assigned a prominence value. In this case, the prominence value indicates the number of relationships between a television program identifier and the root node. A higher prominence value indicates more relationships between the two social objects. For example, a hashtag and a television program identifier that are frequently associated with each other in the social networking system 120 will have a high prominence value.

The mapping server 140 generates a set of each television program identifier 2 nodes away from the root node. Each television program identifier in the set of television program identifiers 2 nodes away from the root node each have a distance of 2. The mapping server 140 generates a prominence value for each television program identifier in the set of television program identifiers 2 nodes away from the root node. The mapping server 140 continues generating sets of television program identifiers at increasing distances from the root node. The mapping server 140 also assigns prominence values to each television program identifier in the sets. In some embodiments, the mapping server 140 traverses the entire graph and assigns a distance and a prominence value to each television program identifier. In other embodiments, the mapping server 140 will stop traversing the graph after a predetermined distance. In other embodiments, any other apparent traversing method, such as depth-first searching, may be used by the mapping server 140.

In some embodiments, the prominence value may be a predetermined value instead of the number of relationships between two nodes. For example, if the EPG data indicates that the hashtag "#sesamestreet" is associated with the television program identifier for Sesame Street, the mapping server 140 may set the prominence value to a very high value.

The mapping server 140 ranks 360 the set of television program identifiers. The mapping server 140 ranks the set of television program identifiers based on the distance and the prominence value. For example, the mapping server 140 may rank 360 the television program identifiers first by distance. For example, television service identifiers associated with shorter distances are assigned a higher rank. The mapping server 140 may subsequently rank the 360 the television program identifiers by the prominence value associated with the television program identifier. This ranking procedure assigns the highest rank to the closest television program identifier with the highest prominence value. In other embodiments, other ranking methods may be used.

The mapping server 140 selects 370 a subset of television program identifiers. The mapping server may select the television program identifiers based on the rank of the television program identifiers. In one embodiment, the mapping server 140 only selects 370 the highest-ranking television program identifier as the subset of television program identifiers. In another embodiment, the mapping server 140 selects 370 a plurality of the highest-ranked television program identifiers.

Any apparent method or algorithm may be used to select 370 the subset of television program identifiers.

The mapping server 140 provides 380 the subset of television program identifiers. The subset of television program identifiers may be provided 380 to the social networking system 120, to the client device 100, or to any other device that can access the mapping server 140 over the network 150.

Example Method for Maintaining a Time-Dependent Graph

Figure 4:
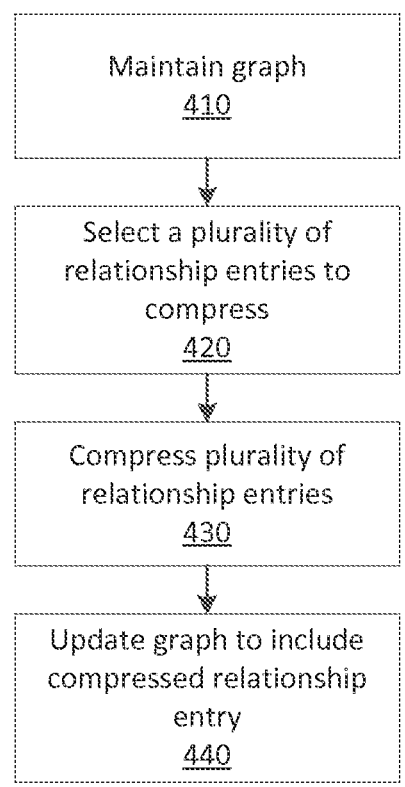
FIG. 4 illustrates a flowchart of a process for maintaining a time-dependent graph data structure, according to one example embodiment.

FIG. 4 illustrates a flowchart of a process for maintaining a time-dependent graph data structure, according to one example embodiment. In one embodiment, the process of FIG. 4 is enabled by at least in part by software code executing on the mapping server 140. For example, the mapping server 140 may comprise computer-executable instructions stored to a non-transitory computer storage medium that, when executed by a processor, causes the processor to perform the steps of FIG. 4 below.

The mapping server 140 maintains 410 a graph. The graph comprises nodes and edges. Edges comprise one or more relationships that connect two nodes. The graph is time-dependent. In one embodiment, the time-dependent graph tracks when relationships are added to the graph. This allows the mapping server 140 to filter the relationships based on time. In other words, the mapping server 140 can filter out old relationships, since old relationships may be less relevant in a constantly changing social networking environment. For example, the mapping server 140 may filter out relationships between the hashtag "#happynewyear" and hashtags for previous years (e.g., "#2009"), since users are unlikely to be posting about events occurring in the distant past. Filtering out old relationship data reduces the amount of data that needs to be analyzed for each query to the mapping server 140.

Additionally or alternatively, the mapping server 140 uses time-dependence to compress data in the graph. For example, each relationship may be associated with a relationship entry. The entry may include the two social objects being connected by the relationship, the timestamp, and a weight. The weight may indicate that the relationship was made a certain number of times within the timeframe associated with the timestamp. For example, the relationship entry <#bees, 1, 12:01-12:02, #wickerman> may indicate that the relationship between two hashtags (#bees and #wickerman) was made once between 12:01 and 12:02. The mapping server 140 may compress old relationships that are less relevant than more recent relationships. For example, three separate relationship entries for #bees and #wickerman at 12:01, 12:02, and 12:10 may be combined into a compressed relationship entry, <#bees, 3, 12:01-12:15, #wickerman>. The compressed relationship entry indicates that the relationship between #bees and #wickerman was made 3 times between 12:01 and 12:15. Thus, the same relationship data is preserved with only a loss in time resolution. However, time resolution is less important for older relationships, especially in social networking systems 120 where older relationships are less relevant. Compressing older data allows the mapping server 140 to keep the old data while reducing the amount of data the mapping server 140 needs to analyze for each query.

The mapping server 140 selects 420 a plurality of relationship entries to compress. The mapping server 140 may select 420 the plurality of relationship entries to compress using the timestamps associated with the relationship entries. The timestamps associated with the plurality of relationship entries may all be within a timeframe. For example, each relationship entry in the plurality of relationship entries may have been created between 12:00 PM and 1:00 PM (or 13:00). The timeframe may be any interval of time. For example, the mapping server 140 may select the plurality of relationship entries with timestamps over one hour old. Furthermore, each of the plurality of relationship entries are along the same edge, meaning that the plurality of relationship entries associate the same social objects.

The mapping server 140 compresses 430 the plurality of relationship entries into a single relationship entry. The mapping server 140 compresses the plurality of relationship entries by generating a compressed relationship entry. The compressed relationship entry comprises a timestamp interval that encompasses all of the timestamps of the plurality of relationship entries. The compressed relationship entry also comprises a compressed weight. The compressed weight may be the sum of all the weights of the plurality of relationship entries.

The mapping server 140 updates 440 the graph to include the compressed relationship entry. The mapping server 140 also removes the plurality of relationship entries.

Example Method for Selecting Social Objects for Removal from a Newsfeed

Figure 5:
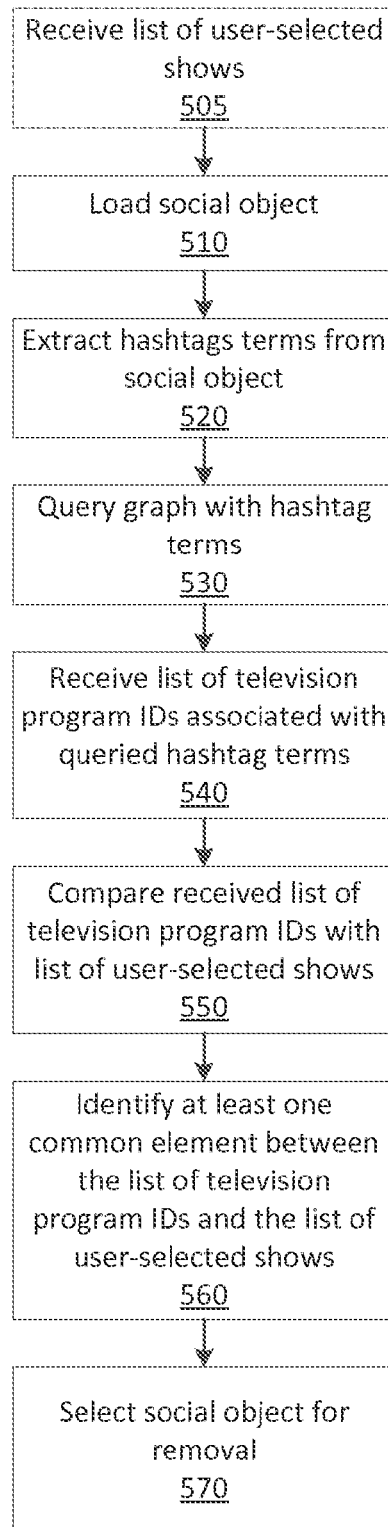
FIG. 5 illustrates a flowchart of a process for selecting social objects for removal from a social networking webpage based on associated metadata, according to one example embodiment.

Now referring to FIG. 5, it illustrates a flowchart of a process for selecting social objects for removal from a social networking webpage based on the associated metadata, according to one example embodiment. The process for relating a metadata tag to a television program identifier, as described above, can be implemented in a social networking system to select undesirable social network content for removal based on metadata associated with the content. For example, the process of FIG. 3 can be applied to a social network to remove posts containing spoilers about a TV show from a user's newsfeed.

The mapping server 140 receives 505 a list of user-selected TV shows. The list is of television shows that a user does not want to see in posts to the social network. For example, the user may be a fan of the TV show Game of Thrones, but may not want to see posts about the show in case another user on the social network discloses plot twists, surprises, or spoilers in a post, thereby ruining the user's experience with both the social network and the TV show. The list of user-selected TV shows includes a set of television program identifiers corresponding to the user-selected TV shows.

In some embodiments, the user selects the television program identifiers to be included in the list through an interface (e.g., the social network user interface or through another application interface, such as the interface of the PEEL SMART REMOTE application). In some embodiments, the list of television program identifiers is generated by the social networking system 120. For example, the social networking system 120 can generate the list of television program identifiers based on which television program identifiers the user has interacted with (e.g., viewed, "liked," commented on, etc.) on the social network.

The mapping server 140 loads 510 a social object. Loading a social object includes receiving the social object or information associated with the social object from the social networking system 120 or from the client device 110. The mapping server 140 also loads metadata associated with the social object such as a hashtag or an @-identifier. The mapping server 140 loads 510 the social object based on a request from the social networking system 120. In some embodiments, the mapping server 140 loads 510 each new social object before the social object is displayed in the social network interface. The mapping server 140 extracts 520 one or more hashtags from the loaded social object.

The mapping server 140 queries 530 the graph. The query is for a set of television program identifiers associated with things. The mapping server 140 queries the graph for each hashtag term in the social object using the process described in FIG. 3. The mapping server 140 receives 540 a list of television program identifiers (IDs) associated with the queried hashtag terms.

The mapping server 140 compares 550 the received list of television program IDs with the list of user-selected television shows. The mapping server 140 compares each element of the received list of television program identifiers with the television program identifiers in the list of user-selected television shows. The mapping server 140 can use any apparent algorithm to compare the lists or match an element in the received list of television program IDs with an element in the list of user-selected television shows. If the two lists share at least one common television program identifier, the mapping server 140 identifies 560 the common element or elements between the list of television program identifiers and the list of user-selected shows. Identifying 560 the television program identifier can also include associating the television program identifier with the loaded 510 social object.

Responsive to identifying 560 at least one common element between the list of television program identifiers and the list of user-selected shows, the mapping server 140 selects the social object for removal. Selecting the social object for removal includes selecting the social object associated with the identified 560 television program identifier. The mapping server 140 notifies the social networking system 120 to remove the selected social object from the user's social networking interface. In some embodiments, the notification includes an instruction to hide or remove the social object from the user's social networking interface. In some embodiments, the notification includes a value (such as a Boolean value) that indicates if the social object is associated with one or more of the television program identifiers in the list of user-selected television shows. The value is sent to the social networking system 120 and is used, by the social networking system 120, to calculate a score for the social object. The social networking system 120 determines to show or remove the social object based on the calculated score.

In some embodiments, the social object is not selected for removal if one or more of the hashtags associated with the social object are on a white list of hashtags. For example, even though the hashtag "#gameofthrones" is related to the television show Game of Thrones, the hashtag is likely to be in a large number of posts that don't necessarily contain spoilers. The user or application may whitelist certain hashtags so not every post related to the television show is hidden or removed.

Additional Configuration Considerations

The disclosed embodiments beneficially allow a mapping server 140 to relate a hashtag to television program. For example, users may wish to share their experiences with media content on a social network. However, they may not be able to share some forms of media, such as broadcast television programs. The disclosed embodiments beneficially relate a social object, such as a hashtag, on a social network to the television program the user is referencing. This allows the mapping server 140 to identify the television program associated with the social object. This information could be used to provide the user with a link to the television program or metadata associated with the television program.

The disclosed embodiments further allows for the mapping server 140 to compress graph data over time. Data is constantly added to the time-dependent graph generated 330 by the mapping server 140. To reduce the time required for a query to the time-dependent graph, the mapping server 140 compresses older data. This allows the time-dependent graph to keep the old data while reducing the time needed to perform a query to the time-dependent graph.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 and 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for relating a hashtag to a television show through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   receiving social object data including a plurality of metadata tags;
   receiving electronic program guide information including a plurality of television program identifiers;
   generating a graph data structure comprising a plurality of nodes and plurality of edges, each node representing a metadata tag of the plurality of metadata tags or a television program identifier of the plurality of television program identifiers, each edge connecting two nodes, each edge including a timestamp based on the social object data;
   receiving information about user-selected television shows;
   querying the graph data structure with a selected metadata tag of the plurality of metadata tags corresponding to a social object of the social object data;
   receiving a set of television program identifiers associated with the selected metadata tag by traversing, with a timestamp within a predetermined timeframe, at least a portion of the plurality of edges of the graph data structure;
   selecting a subset of the set of television program identifiers most closely related to the selected metadata tag by comparing the set of television program identifiers with the information about user-selected television shows; and
   responsive to one of the television program identifiers of the subset corresponding to at least one of the user-selected television shows, selecting the social object for removal from the social object data.

2. The method of claim 1, wherein generating a graph data structure further comprises generating edges of the plurality of edges based on data from the electronic program guide information indicating associations between metadata tags of the plurality of metadata tags and television program identifiers of the plurality of television program identifiers.

3. The method of claim 1, wherein the graph data structure is represented by an array data structure.

4. The method of claim 1, wherein each edge further includes a weight based at least in part on a number of times the connected two nodes are connected in a social network.

5. The method of claim 1, wherein the selected metadata tag is a hashtag associated with the social object.

6. The method of claim 1, wherein querying the graph data structure comprises querying the graph data structure using a breadth-first search.

7. The method of claim 1, wherein selecting the subset of the set of television program identifiers most closely related to the selected metadata tag further comprises generating a distance value, for each node of the plurality of nodes representing a television program identifier, based on a degree of separation between the node and a node representing the selected metadata tag in the graph data structure.

8. The method of claim 7, wherein selecting the subset of the set of television program identifiers most closely related to the selected metadata tag further comprises identifying nodes with distance values greater than a predetermined threshold value.

9. The method of claim 1, wherein the social object is not selected for removal if the selected metadata tag is part of a whitelist.

10. The method of claim 1, further comprising compressing two or more edges of the plurality of edges based on the timestamps of the two or more edges.

11. A computer program product comprising a non-transitory computer readable storage medium having instructions stored thereon, the instructions when executed by a processor cause the processor to:
receive social object data including a plurality of metadata tags;
receive electronic program guide information including a plurality of television program identifiers;
generate a graph data structure comprising a plurality of nodes and plurality of edges, each node representing a metadata tag of the plurality of metadata tags or a television program identifier of the plurality of television program identifiers, each edge connecting two nodes, each edge including a timestamp based on the social object data;
receive information about user-selected television shows;
query the graph data structure with a selected metadata tag of the plurality of metadata tags corresponding to a social object of the social object data;
receive a set of television program identifiers associated with the selected metadata tag by traversing, with a timestamp within a predetermined timeframe, at least a portion of the plurality of edges of the graph data structure;
select a subset of the set of television program identifiers most closely related to the selected metadata tag by comparing the set of television program identifiers with the information about user-selected television shows; and
responsive to one of the television program identifiers of the subset corresponding to at least one of the user-selected television shows, select the social object for removal from the social object data.

12. The computer program product of claim 11, wherein the instructions to generate a graph data structure further comprise instructions to generate edges of the plurality of edges based on data from the electronic program guide information indicating associations between metadata tags of the plurality of metadata tags and television program identifiers of the plurality of television program identifiers.

13. The computer program product of claim 11, wherein the graph data structure is represented by an array data structure.

14. The computer program product of claim 11, wherein each edge further includes a weight based at least in part on a number of times the connected two nodes are connected in a social network.

15. The computer program product of claim 11 wherein the selected metadata tag is a hashtag associated with the social object.

16. The computer program product of claim 11, wherein the instructions to query the graph data structure further comprise instructions to:
query the graph data structure using a breadth-first search.

17. The computer program product of claim 11, wherein the instructions to select the subset of the set of television program identifiers most closely related to the selected metadata tag further comprise instructions to generate a distance value, for each node of the plurality of nodes representing a television program identifier, based on a degree of separation between the node and a node representing the selected metadata tag in the graph data structure.

18. The computer program product of claim 17, wherein the instructions to select the subset of the set of television program identifiers most closely related to the selected metadata tag further comprise instructions to identify nodes with distance values greater than a predetermined threshold value.

19. The computer program product of claim 11, further comprising instructions that cause the processor to compress two or more edges of the plurality of edges based on the timestamps of the two or more edges.

20. The computer program product of claim 11, wherein the social object is not selected for removal if the selected metadata tag is part of a whitelist.

* * * * *